US007070356B2

(12) United States Patent
Kronenberg et al.

(10) Patent No.: US 7,070,356 B2
(45) Date of Patent: *Jul. 4, 2006

(54) MULTIPART PLUG-TYPE CONNECTOR

(76) Inventors: Ralf Max Kronenberg, Mozartstr. 22, D-42781 Haan (DE); Max Kronenberg, Bünkenberg 2, D-42655 Solingen (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/862,228

(22) Filed: Jun. 7, 2004

(65) Prior Publication Data

US 2005/0214100 A1 Sep. 29, 2005

(30) Foreign Application Priority Data

Mar. 24, 2004 (DE) .................. 20 2004 004 734 U

(51) Int. Cl.
*F16B 39/22* (2006.01)

(52) U.S. Cl. ...................... 403/297; 411/458; 403/298; 403/292

(58) Field of Classification Search ................ 411/458, 411/385; 403/297–298, 292, 295, 288, 408.1, 403/267, 375, 331; 52/726
See application file for complete search history.

(56) References Cited

U.S. PATENT DOCUMENTS 2,850,304 A * 9/1958 Wagner ...................... 285/397
3,484,830 A * 12/1969 Wagner et al. .............. 285/397
3,728,833 A * 4/1973 Grossman .................... 52/211
4,097,320 A * 6/1978 Brauer et al. ............... 156/109
4,105,348 A * 8/1978 Anderson et al. ........... 403/172
4,158,336 A * 6/1979 Brescia et al. .............. 108/190
4,249,830 A * 2/1981 Day ............................. 403/7
4,299,421 A * 11/1981 Bontrager ................ 296/26.05
4,323,319 A * 4/1982 Adams ....................... 403/171
4,431,331 A * 2/1984 Brody ........................ 403/189
4,453,855 A * 6/1984 Richter et al. ............. 403/295
4,513,546 A * 4/1985 Gow ........................... 52/172
4,530,195 A * 7/1985 Leopold .................. 52/717.02
4,608,802 A * 9/1986 Bayer ........................ 52/786.1
4,657,426 A * 4/1987 Targetti ...................... 403/297
4,683,634 A * 8/1987 Cole ........................... 29/412
4,896,992 A * 1/1990 Muhlethaler ................ 403/297
5,022,777 A * 6/1991 Kolvites ...................... 403/14
5,031,377 A * 7/1991 Beckmann ................... 52/631
5,048,997 A * 9/1991 Peterson ..................... 403/295
5,105,643 A * 4/1992 Bayer .......................... 72/325
5,127,762 A * 7/1992 Havlovitz ................... 403/298
5,144,780 A * 9/1992 Gieling et al. ................ 52/298
5,209,599 A * 5/1993 Kronenberg ................ 403/298
5,431,210 A * 7/1995 Nelson et al. .............. 160/135
5,466,534 A * 11/1995 Newby ....................... 428/457
5,560,731 A * 10/1996 Kronenberg ................ 403/298
5,678,377 A * 10/1997 Leopold .................... 52/656.9

(Continued)

FOREIGN PATENT DOCUMENTS

DE 3236110 A1 * 3/1984

(Continued)

*Primary Examiner*—Robert J. Sandy
*Assistant Examiner*—Jeffrey A. Sharp
(74) *Attorney, Agent, or Firm*—McGlew & Tuttle, P.C.

(57) ABSTRACT

A plug-in connector for hollow sections of spacer frames for insulating glass panes with two connector parts which can be plugged together. The connector parts have one of an essentially U-shaped and box-shaped cross section. The connector parts include side walls which are adjacent to each other in a plugged-together position of the two connector parts. A positive-locking connection is arranged on the connector parts and acts on all sides at the side walls.

20 Claims, 3 Drawing Sheets

U.S. PATENT DOCUMENTS

| | | | | |
|---|---|---|---|---|
| 6,347,902 | B1 * | 2/2002 | Loh | 403/298 |
| 6,406,213 | B1 * | 6/2002 | Dohman et al. | 403/298 |
| 6,431,784 | B1 * | 8/2002 | Kronenberg | 403/297 |
| 6,568,873 | B1 * | 5/2003 | Peterson | 403/305 |
| 6,599,051 | B1 * | 7/2003 | Jarasson | 403/326 |
| 6,676,326 | B1 * | 1/2004 | Wu | 403/329 |
| 6,709,187 | B1 * | 3/2004 | Loh | 403/298 |
| 6,764,247 | B1 * | 7/2004 | Kronenberg | 403/292 |
| 6,896,440 | B1 * | 5/2005 | Trpkovski et al. | 403/294 |
| 2003/0202844 | A1 * | 10/2003 | Bayer | 403/286 |

FOREIGN PATENT DOCUMENTS

| | | | | |
|---|---|---|---|---|
| DE | 3806845 | A2 | * | 2/1989 |
| DE | 92 09 382.5 | | | 7/1993 |
| DE | 29613519 | U1 | * | 12/1997 |
| DE | WO 99/131192 | | * | 3/1999 |
| DE | 299 09 413 | | | 11/2000 |

* cited by examiner

Fig. 4
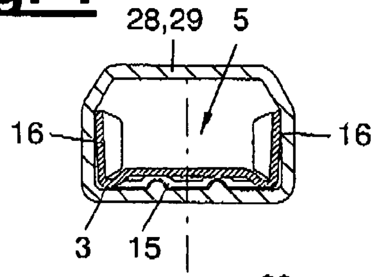
Fig. 6
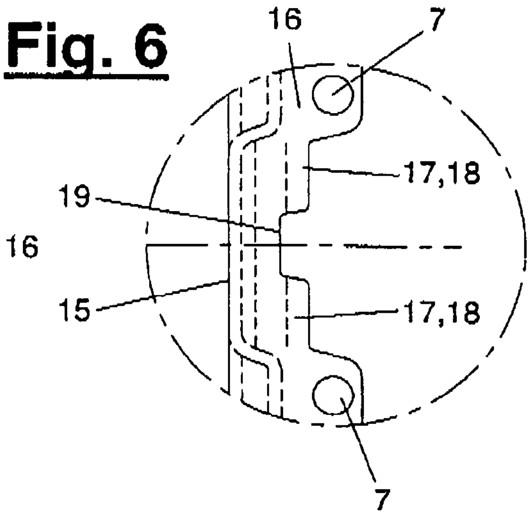
Fig. 3
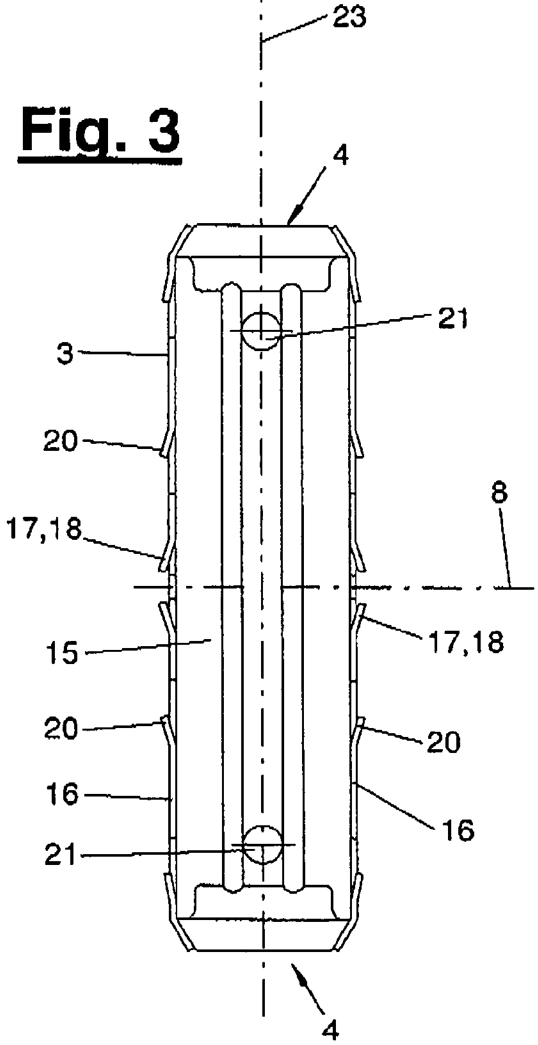
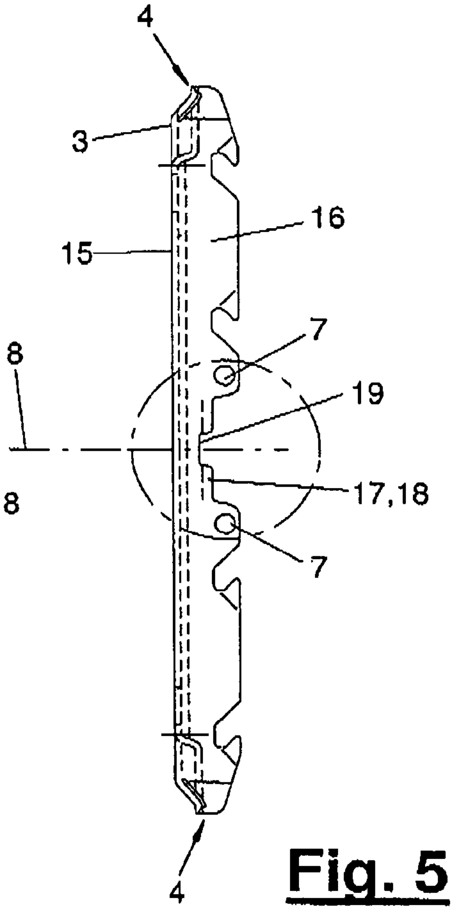
Fig. 5

Fig. 8
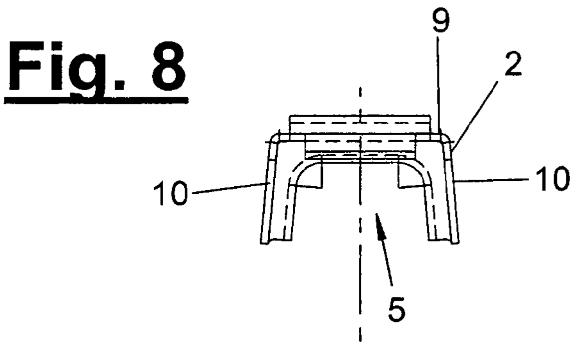
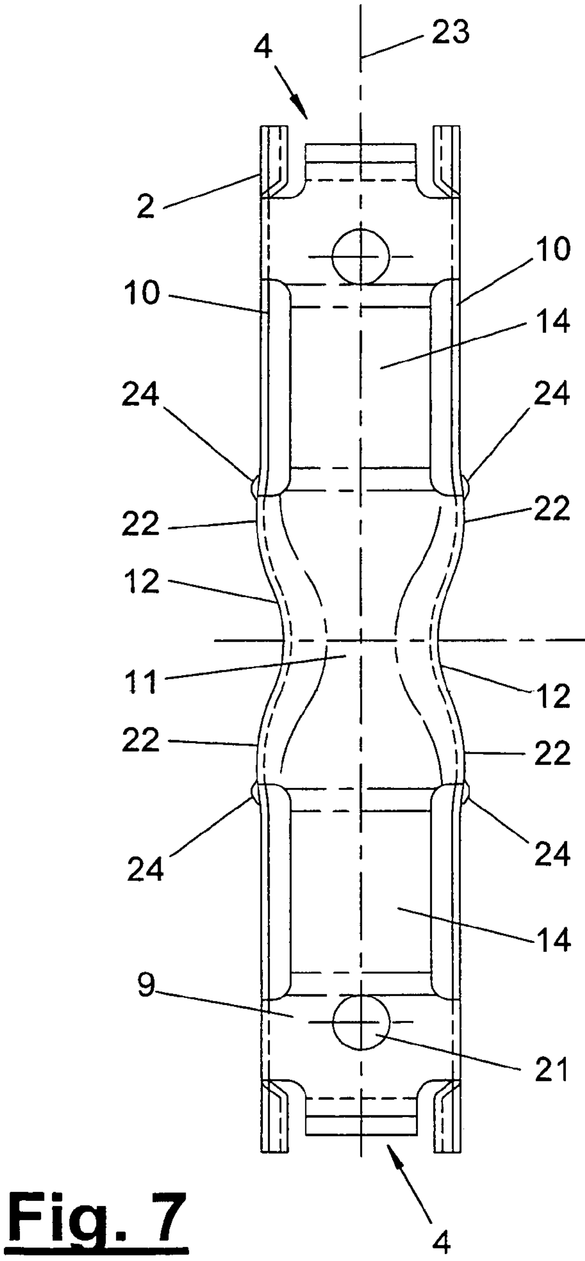
Fig. 7
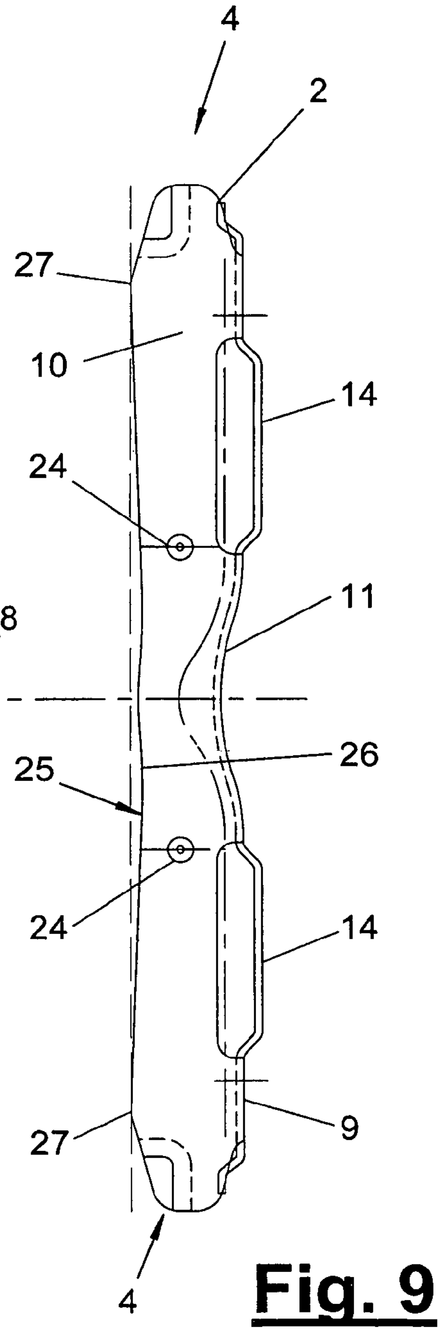
Fig. 9

MULTIPART PLUG-TYPE CONNECTOR

CROSS REFERENCE TO RELATED APPLICATIONS

This application claims the benefit of priority under 35 U.S.C. § 119 of German application 20 2004 004 734.9 filed 24/Mar./2004, the entire contents of which are incorporated herein by reference.

FIELD OF THE INVENTION

The present invention pertains to a multipart plug-in connector for hollow sections of spacer frames for insulating glass panes with two said connector parts which can be plugged together, with an essentially U-shaped or box-shaped cross section, and which have said side walls which are adjacent to each other in the plugged-together position

BACKGROUND OF THE INVENTION

Such a plug-in connector, which comprises, e.g., two connector parts, which can be plugged together and have a U-shaped cross section, is known from DE 92 09 382 U1. The two shell profiles are supplied individually and plugged together loosely before they are installed in the hollow section. They may fall apart from this plugged-together position. Mutual guiding is ensured only in the longitudinal and transverse directions via end-side, bent-up front lobes and lateral guide grooves at the middle wall of the lower or outer shell profile.

Another two-shell plug-in connector is known from DE 299 09 413 U1. The two connector parts are guided here at one another in the longitudinal and transverse directions by positive locking, and are prevented from falling apart by a non-positive frictional or clamping connection. This clamping connection is present between the side walls of the inner or upper part and the transversely located middle wall of the outer or lower part. Like the state of the art mentioned in the introduction, this connection technique is designed for the manual insertion of the plug-in connectors.

SUMMARY OF THE INVENTION

The object of the present invention is to show an improved plug-in connector.

The present invention accomplishes this object with a plug-in connector for hollow sections of spacer frames for insulating glass panes, wherein the plug-in connector comprises at least two said connector parts which can be plugged together, with an essentially U-shaped or box-shaped cross section, and which have side walls which are adjacent to each other in the plugged-together position. The connector parts have a positive-locking connection acting on all sides at the side walls.

The positive-locking connection acting on all sides being claimed has the advantage that the parts of the connector are held together substantially better. As a result, the multi-part plug-in connector is also suitable for mechanical insertion during the feeding and plugging in of the plug-in connector in the hollow sections. In addition, the positive-locking connection offers a better mutual positioning of the connector parts in the longitudinal axis of the connector. As a result, the functional elements can be aligned accurately in relation to one another in the connector parts, e.g., in central stops and indentations or depressions. Due to the positive-locking connection, the parts of the plug-in connector can be already plugged together by the manufacturer, warehoused as a plurality of connectors if so desired by the customer and reliably transported and handled in this position. The parts of the plug-in connector are reliably prevented from falling apart from the time they are plugged together until they are inserted in the hollow sections.

The arrangement of the positive-locking connection at the side walls of the parts of the plug-in connector has the advantage that a surface contact and guiding contact can be easily established here. The connection sites can be placed into areas of the side wall that are not critical for the function. The effort needed to change the positive-locking connection is kept within limits, and, in particular, there are no functional limitations for the plug-in connector. Despite the positive-locking connection of the parts of the plug-in connector, the shape of the plug-in connector can be optimally adapted to the plugging and connection tasks to be performed in the hollow sections.

The positive-locking connection can be designed and arranged in different ways. In the preferred embodiment, embossed areas and openings that correspond to each other are present at the adjacent side walls. The embossed areas are preferably knob-shaped or conical with an essentially round jacket circumference. As a result, a centering function can be obtained in both cases in cooperation with the openings, which are preferably round as well. An all-side positive-locking guiding is possible by means of the embossed areas and openings with small space requirement at the respective connection site. As an alternative, the cross section of the knob may be semicircular with a straight secant, which is favorable for reliable locking. The effort needed to manufacture the embossed areas and the openings is very small.

The plug-in connector and its connector parts may otherwise have any desired shape and embodiment, which is adapted especially to the particular hollow sections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 through 6 are different tilted views and a detail of the outer or lower connector part; and FIGS. 7 through 9 are different tilted views of the inner or upper connector part.

DESCRIPTION OF THE PREFERRED EMBODIMENT

Figure 1:
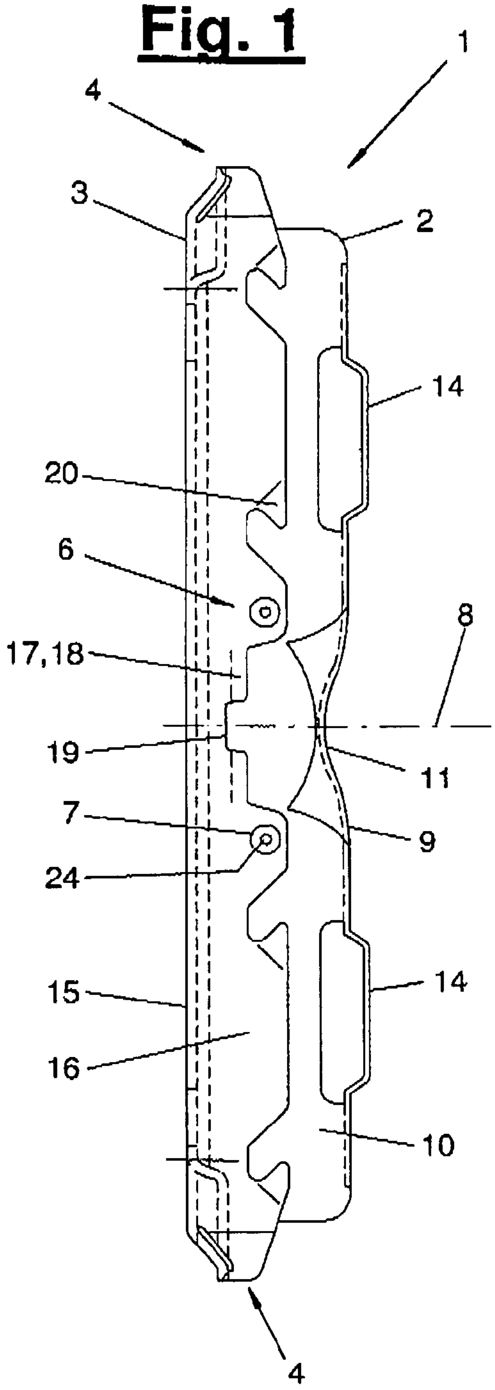
FIGS. 1 and 2 are a side view and a tilted top view of a plug-in connector put together from two connector parts.
Figure 2:
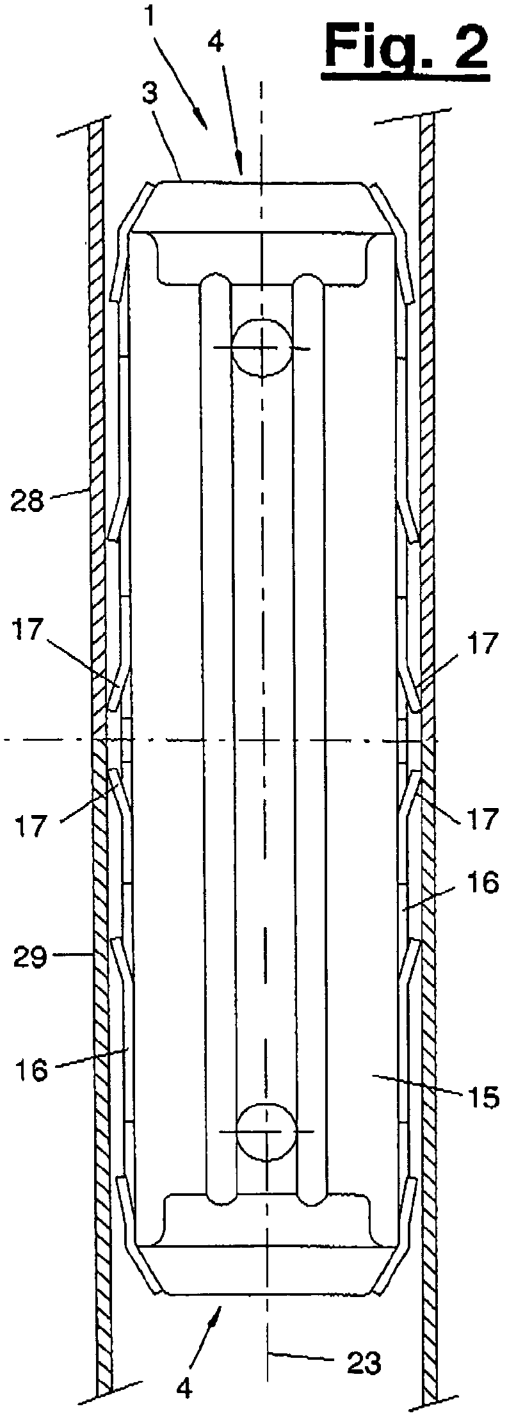

Referring to the drawings in particular, FIGS. 1 through 9 show different views of a plug-in connector 1, which comprises two connector parts 2, 3 in the embodiment shown. The plug-in connector 1 is intended for hollow region sections of spacer frames 28, 29 for insulating glass panes. In terms of the design and the arrangement of the connector parts 2, 3, the plug-in connector 1 shown corresponds largely to the embodiment known from DE 299 09 413 U1.

The plug-in connector 1 according to the present invention has a positive-locking connection 6 acting on all sides for its connector parts 2, 3, which is arranged and acts at or on the side walls 10, 16.

The plug-in connector 1 is preferably arranged in the hollow sections such that one connector part, the so-called upper part 2, points toward the outer side of the frame. The other connector part, the so-called lower part 3, is directed, by contrast, toward the inner side of the frame and the interior space of the pane. The hollow sections, pushed over the plug-in connector 1 on both sides, abut against each other at the connection site. This is preferably also the transversely extending central axis 8 of the plug-in connector 1. The plug-in connector 1 otherwise also has a longitudinal axis 23.

A viscous or pasty sealant (not shown), which penetrates into a free space at the plug-in connector and sealingly surrounds the plug-in connector 1, preferably on three sides, may be introduced into the hollow sections at the connection site 8. The sealant may consist of any suitable material, e.g., a pasty butyl compound.

The plug-in connector 1 has an essentially box-shaped and closed cross section with a cavity 5 located on the inside, which is axially accessible through preferably open front or end sides 4. The granulated desiccant (not shown) present in the hollow sections can flow through the tube-like plug-in connector 1 and pass from one hollow section to the next beyond the connection site 8. Via longitudinally extending perforations at the bottom or inner wall of the hollow sections, the desiccant can come into connection with residual moisture outside the plug-in connector 1 in the air or in a special gas in the interior space of the panes. The perforations may be surrounded by corresponding grooves at the middle wall 15 of the lower part.

Both of the two connector parts 2, 3 have an essentially U-shaped cross section. They are plugged together at right angles to the longitudinal axis 23 of the connector, and are connected with one another by means of the connection 6 in an all-side positive-locking manner. The lower part 3 is preferably broader than the upper part 2, so that the upper part 2 can be plugged into the lower part 3. The upper part 2 is therefore also called the inner part and the lower part 3 is also called the outer part. Both connector parts 2, 3 have a middle wall 9, 15 each, and two bent side walls 10, 16 each adjoining same. The connector parts 2, 3 are shown individually in FIGS. 3 through 9.

The lower or outer part 3 preferably has two continuous and essentially straight side walls 16 along the longitudinal axis 23. The outer part 3 is adapted to the shape of the hollow section and the side walls 16 and the middle wall 15 of the outer part 3 are in contact with the adjacent walls of the hollow section, and are largely flat and two-dimensional.

The upper or inner wall 2 has an indentation 12 in the area of the connection site or central axis 8, e.g., at the two side walls 10. The indentation 12 is set back in relation to the respective adjacent side wall 16 of the lower or outer part 3. As a result, free spaces 13 are formed at the plug-in connector 1 between the side walls 10, 16 on both sides. Sealant can penetrate into these free spaces from the outer side of the hollow section.

The side walls 10 of the upper or inner part 2 bulge out laterally at the axial ends of the indentation 12 to form projections 22, which have a rounded shape and are sealingly in contact with the adjacent side walls 16 of the lower or outer part 3. The lateral free spaces 13 can be limited as a result. The side walls 10 of the upper or inner part can again be set back somewhat inwardly behind the projections 22.

In addition, the upper part 2 has a depression 11 at its middle wall 9 at the connection site 8. A free space may likewise be formed as a result for receiving sealant between the outer wall of the hollow section and the depression 11. The sealant can tightly surround the plug-in connector on three sides in the area of the connection site 8 due to the depression 11 and the indentations 12.

The positive-locking connection 6 between the connector parts 2, 3 preferably comprises four connection sites, at which embossed areas 24 and openings 7, which engage one another, are present at the side walls 10, 16. The four connection sites along with the embossed areas 24 and openings 7 are arranged on both sides of the central axis 8 and at the two side walls 10, 16.

The embossed areas 24 are preferably arranged at the side walls 10 of the inner or upper part 2 and are directed toward the outside. The embossed areas 24 preferably have a hemispherical shape or a conical shape with an essentially round cross section and with a closed wall. As an alternative, they may also be hemispheres that are flattened partially or on half a side or cones with an, e.g., semicircular cross section. The embossed areas 24 may be embossed from the side wall 10 by deforming the wall. As an alternative, they may also be placed on the side wall 10 on the outside.

The openings 7 are arranged at the side walls 16 of the outer or lower part 3. The openings 7 preferably have a round shape, and their diameter is adapted to the embossed areas 24 such that a circular positive-locking contact and guiding is obtained in case of engagement. As an alternative and in adaptation to the flattened hemispheres or cones, they may also be semicircular, in which case the shapes are congruent. During the plugging together of the connector parts 2, 3, the embossed areas 24 act as clip knobs, which snap into the clip openings 7. The side walls 10, 16 mutually yield somewhat elastically for this clipping in and then snap back. The side walls 10, 16 are preferably directed in parallel and are arranged directly at each other in the connection area. The spring force of the side walls 10, 16 will then secure the clip connection between the embossed areas 24 and the openings 7. An oblique or rounded outer shape of the embossed areas 24 facilitates the sliding up on the adjacent outer side walls 16.

As is illustrated by the top view of the inner or upper part 2 in FIG. 7, the side walls of this part are again set back somewhat in a rounded area in the axial direction toward the respective front side or end 4 after the zenith of the projections 22 in order to then pass over into a straight or flat wall shape. The embossed areas 24, which are arranged at about half the height of the side walls 10, are located at this setback. Due to this shape, the embossed areas 24 and the corresponding openings 7 are located on both sides of the central axis 8 between the projections 22 and the respective adjacent front side 4 of the plug-in connector 1.

As is illustrated by the tilted side view of FIG. 7 in FIG. 9, the side walls 10 of the inner or upper part 2 have at their lower free end 26 a setback or a concave arch 25, which extends beyond the central axis 8 and reaches two end-side support points 27 at the end area of the side walls 10. The concave arch 25 is illustrated in FIG. 9 on the basis of a continuous straight line drawn as a broken line between maximum points of the sidewalls 10. Due to this design, the inner or upper part 2 lies on the middle wall 15 of the outer or lower part 3 at the four end-side support points 27 only. There is a distance between the edge 26 of the side walls 10 and the outer middle wall 15 in the middle area and between the embossed areas 24. This shape supports the reliable snapping in of the clip knobs and the positive locking as well as the guiding of the connection 6.

At the connection site 8, the inner or upper part 2 may have a depression 11 at its middle wall, as a result of which a free space is also formed for receiving sealant between the outer wall of the hollow section 6 and the depression 11. FIGS. 7 and 8 show this arrangement. Due to the depression 11 and the indentations 12, the sealant can flow sealingly around in the plug-in connector 1 in the area of the connection site 8 on three sides. The embossed areas 24 and openings 7 are located, in addition, under the axial ends of the depression 11.

Furthermore, the upper part 2 may have an upwardly or outwardly projecting and preferably elastic hump 14 at its middle wall 9 on both sides at axially spaced locations from the connection site 8, which hump can come sealingly into contact with the adjacent wall of the hollow section. Due to their elastic contact, the humps 14 ensure, on the one hand, a tolerance compensation. On the other hand, the humps 14 axially limit the free space formed by the depression 11 and prevent the further axial penetration of the sealant.

As is illustrated by FIGS. 3 through 6, the lower or outer part 3 may have a recess or a cutout 19 each in the area of the connection site 8 at its two side walls 16 at the upper, free edge. Due to the recess 19, the edge of the side walls 16 is set back except for a small web. Due to the recess 19, a free space can be additionally formed, through which the sealant at the connection site 8 can reach the side walls of the hollow section as far as possible.

At the central axis 8, the lower or outer part 3 has a plurality of central stops 17, which may have any suitable design. For example, they are four laterally extended spring bosses 18, which are arranged at the free edge of the side wall 16 and in the area of the recess 19. Due to the spring bosses 17, the recess 19 obtains a triply stepped shape. The central stops 17 are directed against each other and are axially set back somewhat from the central axis 8. As an alternative, two individual spring bosses may be present, which are directed toward each other and are located opposite each other on both sides at the connection site 8. In another variation, fixed stops, which act on one side or on both sides, fixed stops that can dig into the front walls of the section, etc., are possible.

The clip openings 7 are located at the upper free edge of the side walls 16 and are arranged on both sides of the stepped recess 19. FIG. 6 shows the arrangement and the design in a detail view of the circle indicated in FIG. 5. FIG. 4 is a tilted front view of the connector part 3 from FIG. 3.

The side walls 16 of the lower or outer part 3 may have a smaller height than the side walls 10 of the upper or inner part 2. A lateral free space toward the adjacent walls of the hollow section is additionally formed as a result for receiving sealant.

In practice, the sealant 7 is filled in during the assembly of the plug-in connector 1. The two hollow sections are first pushed over the ends of the plug-in connector 1 on both sides, only up to the areas where the depression 11 begins. The sealant is then injected through the remaining gap in a suitable manner from the outer side of the hollow sections, or it is filled by another manner. The sealant surrounds the plug-in connector 1 and fills the above-described free space. The two hollow sections are then pushed together up to the junction site 8 and the central stops 17. The plug-in connector 1 and the hollow sections are then sealed at the junction site 8 by means of the sealant in the interior space.

The hold of the plug-in connector 1 in the attached hollow sections 6 may be ensured by a plurality of suitable retaining elements 20. These are, e.g., spring bosses that are cut free and extended laterally at the free edges of the side walls 16 of the lower part 3. In addition, humps 14 may be used as retaining means due to their frictional engagement with the wall of the hollow section.

The plug-in connector 1 and its connector parts 2, 3 are preferably stamped and bent parts made of metal, especially a pretreated and quenched and tempered steel plate. As an alternative, they may also consist of any other suitable material, e.g., a plastic. Different material combinations or composites are also possible.

In the preferred stamped and bent part, the clip knobs 24 are pushed out of the side walls 10 of the inner or upper part 2. In the case of an injection molded or cast part made of plastic, flowable metals or other materials, the clip knobs 24 may be made integrally or attached. The embossed areas 24 may also be prepared in any other manner.

Moreover, the humps 14 on the upper part 2 may be cut free and bent up in the case of a stamped and bent part. In addition, both connector parts 2, 3 may have centering holes 21 at their ends, which said centering holes are flush in the connected position and facilitate the mechanical plugging together of the connector parts 2, 3 due to their function as a guide in conjunction with passed-through pins or conical slides. The centering holes 21 are, moreover, advantageous for the accurate and centrally symmetrical stamping and bending of the connector parts 2, 3 from the steel sheet mill bars.

Various variants of the embodiment being shown and described are possible. On the one hand, the number of connector parts may vary and may be greater than two. On the other hand, the assignment of the connector parts 2, 3 may be reversed. A kinematic reversal is also possible in the case of the embossed areas 24 and openings 7, and the embossed areas 24 may be arranged in the variant at the side walls 16 of the outer or lower part 3 and directed inwardly. The openings 7 are correspondingly located at the side walls 10 of the inner part 2.

The shape of the embossed areas 24 and openings 7 is variable as well. The embossed areas 24 may have, e.g., a prismatic shape or a pyramidal shape and closed wall. As an alternative, it is also possible to provide spring bosses that are cut free laterally and chiseled out. The shape of the openings 7 is then correspondingly adapted, Moreover, the shape and the mutual shape adaptation and assignment of the connector parts 2, 3 may be varied as desired. In another variant, the plug-in connector 1 may have closed front sides or ends 4 and act as a stop for the desiccant. Finally, the indentations 12 may be done away with, so that the connector parts 2, 3 have essentially straight side walls 10, 16 and have a shape similar to that described in DE 92 09 382 U1. In another variant, it is also possible to do away with the central depression 11. The humps 14 may be replaced by other retaining elements. These may be, e.g., spring bosses that are cut free and extended obliquely or passage openings at the upper middle wall 9 for receiving wall caulking of the hollow sections, which said wall caulking forms positive locking engagements, or other similar parts.

While specific embodiments of the invention have been shown and described in detail to illustrate the application of the principles of the invention, it will be understood that the invention may be embodied otherwise without departing from such principles.

APPENDIX

| LIST OF REFERENCE NUMBERS | |
|---|---|
| 1 | Plug-in connector |
| 2 | Connector part, inner part, upper part |
| 3 | Connector part, outer part, lower part |
| 4 | Front side |
| 5 | Cavity |
| 6 | Positive-locking connection, clip connection |
| 7 | Opening, clip opening |
| 8 | Central axis, connection site |
| 9 | Middle wall, inner part |
| 10 | Side wall, inner part |
| 11 | Depression |
| 12 | Indentation |
| 13 | Free space |
| 14 | Hump |
| 15 | Middle wall, outer part |
| 16 | Side wall, outer part |
| 17 | Central stop |
| 18 | Spring boss |
| 19 | Recess, cutout |
| 20 | Retaining element |
| 21 | Centering hole |
| 22 | Projection |
| 23 | Longitudinal axis of connector |
| 24 | Embossed area, clip knob |
| 25 | Arch, lower edge |
| 26 | Free edge of side wall |
| 27 | Support point |

What is claimed is:

1. A plug-in connector for hollow sections of spacer frames for insulating glass panes, the connector comprising:

a longitudinal center axis;

a first outer connector part configured to be inserted into a hollow region of a spacer frame and a second inner connector part sized to be plugged into said first outer connector part, each of said first and second connector parts extending along said longitudinal center axis with an essentially U-shaped transverse cross section, said U-shaped transverse cross-section being generally defined by two side walls extending dogleggedly from a middle wall;

wherein said first outer connector part has a plurality of openings in at least one of its sidewalls;

wherein said second inner connector part includes a central indentation in at least one of its sidewalls so as to form a portion set back in relation to an adjacent portion of said first outer connector part and also has an embossed area extending outwardly from at least one of its sidewalls, each embossed area corresponding to and aligning with one of said openings in the first outer connector part, such that the embossed areas and openings positively engage each other and substantially prevent relative movement between said first and second connector parts in all directions.

2. A plug-in connector in accordance with claim 1, wherein:

said first and second connector parts have a plurality of embossed areas and openings that engage each other at said side walls for said positive-locking connection and said openings are disposed symmetrically about a center axis of said plug-in connector which is perpendicular to said longitudinal center axis.

3. A plug-in connector in accordance with claim 1, wherein:

said connector parts have four embossed areas, two of said four embossed areas arranged on each of said inner side walls and four openings, two of said four openings arranged on each of said outer side walls.

4. A plug-in connector in accordance with claim 2, wherein:

said outwardly directed embossed areas are arranged at said side walls of said second inner connector part of said plugged-together position and said openings are arranged at said side walls of said first outer connector part of said plugged-together position.

5. A plug-in connector in accordance with claim 2, wherein:

each of said embossed areas is a hemispherical or conical shape and a cross-sectional shape adapted to each of said openings.

6. A plug-in connector in accordance with claim 1, wherein:

said inner second connector part further includes a projection forming an outwardly extending bulge at each end of said at least one central indentation in a direction along said longitudinal center axis, said projections being in contact with an opposite said outer side wall of said outer first connector part, wherein said second inner connector part has an embossed area extending outwardly from each projection, each embossed area corresponding to and aligning with one of said openings in the first outer connector part on both sides of said central axis between said projections and two adjacent open ends of the plug-in connector and positively engaging each other.

7. A plug-in connector in accordance with claim 1, wherein said outer first connector part has a recess and one or more central stops in an area of a central axis at said side walls.

8. A plug-in connector in accordance with claim 1, wherein:

two central stops acting on one side are provided, said two central stops being directed toward each other.

9. A plug-in connector in accordance with claim 6, wherein:

said outer first connector part has an outside depression and a recess in an area of said central axis, said outer first connector part forms an enlarged free space with said indentation of said inner connector part and said recess which extends on three sides of said outer first connector part for receiving a sealant in said area of said central axis.

10. A plug-in connector in accordance with claim 1, wherein:

one of said first and second connector parts is an inner second connector part of said plugged-together position and the other of said connector parts is an outer first connector part of said plugged-together position, said inner second connector part having a middle wall between said side walls, said inner second connector part having an elevated elastic hump at said middle wall on both sides of a central axis.

11. A plug-in connector in accordance with claim 1, wherein:

one of said first and second connector parts is an inner second connector part of said plugged-together position and the other of said connector parts is an outer first connector part of said plugged-together position, said inner second connector part having a concave arch between end-side support points at a free edge of said side walls.

12. A plug-in connector in accordance with claim 1, wherein:

said first and second connector parts have open ends in said plugged together position.

13. A plug-in connector in accordance with claim 1, wherein:

one of said first and second connector parts has retaining elements.

14. A plug-in connector in accordance with claim 13, wherein:

one of said first and second connector parts has central stops, said central stops and said retaining elements being designed as spring bosses.

15. A plug-in connector in accordance with claim 1, wherein:

said first and second connector parts are designed as a stamped and bent part made of metal.

16. A plug-in connector for hollow sections, the connector comprising:

a longitudinal center axis;

an inner connector part extending along said longitudinal center axis and having a substantially U-shaped cross section with inner side walls;

an outer connector part extending along said longitudinal center axis and having a substantially U-shaped cross section with outer side walls and narrowed end walls at distal ends, said outer connector part configured to be inserted into a hollow region of a spacer frame, said inner and outer side walls of said connector parts being shaped to have said inner connector part fit into said outer connector part in a direction perpendicular to said longitudinal center axis;

a positive locking connection arranged on said sidewalls of said connector parts and positively connecting said inner and outer connector parts when said connector parts are fit into each other, wherein said positive locking connection is defined by a plurality of embossed areas formed on at least one of said inner side walls of said inner connector part and a plurality of openings formed on at least one of said outer side walls of said outer connector part with said embossed areas corresponding to and positively engaging material surfaces of said openings at said side walls and substantially prevent relative movement between said inner and outer connector parts in all directions.

17. A connector in accordance with claim 16, wherein:

said positive locking connection definitely, constantly and exactly connects said first and second connector parts with each other and said inner connector pan includes a central indentation in at least one of its sidewalls so as to form a portion set back in relation to an adjacent portion of said outer connector part, and wherein said inner connector part further includes a projection forming an outwardly extending bulge at each end of the at least one central indentation in a direction along said longitudinal center axis, said embossed area extending outwardly from each projection.

18. A plug-in connector for hollow sections formed by the process of:

providing an outer connector part configured to be inserted into a hollow region of a spacer frame, said outer connector part extending along a longitudinal center axis with an essentially U-shaped transverse cross section and a substantially flat bottom middle wall having a first and a second outer side walls dogleggedly connected to corresponding side edges of said bottom middle wall, wherein said first outer side wall includes a first portion of a means for locking at a particular area;

providing an inner connector part extending along said longitudinal center axis with an essentially U-shaped transverse cross section and a substantially flat inner middle wall having a first and a second inner side walls dogleggedly connected to corresponding side edges of said flat inner middle wall, wherein said first inner side wall includes a corresponding second portion of said means for locking placed to interact with said first portion;

plugging said inner connector part inside said outer connector part so that said first inner side wall is adjacent to said first outer side wall; and moving said inner side wall alongside said outer side wall so that said first portion and said second portion of said means for locking lock said inner connector part with said outer connector part by a positive material engagement, wherein said inner connector part includes a central indentation in at least one of its inner side walls so as to form a portion set back in relation to an adjacent portion of said outer connector part, and wherein said inner connector part further includes a projection forming an outwardly extending bulge at each end of at least one central indentation in a direction along said longitudinal center axis, such that said means for locking substantially prevents relative movement between said outer and inner connector parts in all directions.

19. A plug-in connector according to claim 18, further comprising:

providing a plurality of extended spring means along said first and second outer side walls to exert force on said locking means, wherein at least one of said first portion and said second portion of said means for locking is defined as an elevated protrusion extending outwardly from each projection and the other portion is defined as a hole with diameter large enough to receive said protrusion, each projection corresponding to and aligning with said hole such that the projection and the hole positively engage each other and substantially prevent relative movement between said outer and inner connector parts.

20. A plug-in connector according to claim 18, wherein four means for locking are provided with two means for locking placed apart on said first inner side wall and said first outer side wall and other two means for locking are placed apart on said second inner side wall and said second outer side wall.

* * * * *